(12) United States Patent
Clark

(10) Patent No.: US 9,562,624 B2
(45) Date of Patent: Feb. 7, 2017

(54) VALVE STRIP RETAINER ASSEMBLY

(71) Applicant: Derold G Clark, Sylvan Lake (CA)

(72) Inventor: Derold G Clark, Sylvan Lake (CA)

( * ) Notice: Subject to any disclaimer, the term of this patent is extended or adjusted under 35 U.S.C. 154(b) by 206 days.

(21) Appl. No.: 14/314,267

(22) Filed: Jun. 25, 2014

(65) Prior Publication Data
US 2015/0354725 A1    Dec. 10, 2015

(30) Foreign Application Priority Data

Jun. 9, 2014  (CA) .................................... 2853935

(51) Int. Cl.
*F16K 27/08*    (2006.01)
*F16K 43/00*    (2006.01)
*F16K 3/02*    (2006.01)

(52) U.S. Cl.
CPC ............. *F16K 43/00* (2013.01); *F16K 3/0218* (2013.01); *F16K 3/0227* (2013.01); *Y10T 137/0441* (2015.04); *Y10T 137/6065* (2015.04)

(58) Field of Classification Search
CPC ...... F15D 1/0005; F16K 3/0209; F16K 43/00; G01F 1/42
USPC ... 137/315.27, 377, 382; 251/176, 248, 250, 251/330
See application file for complete search history.

(56) References Cited

U.S. PATENT DOCUMENTS

| | | |
|---|---|---|
| 1,938,460 A | 12/1933 | Vluff |
| 1,996,192 A | 4/1935 | Daniel |
| 2,050,544 A | 8/1936 | Robinson et al. |
| 2,217,216 A * | 10/1940 | Davis ...................... F16K 3/186 138/44 |
| 3,194,259 A | 7/1965 | Garrod |
| 3,817,287 A | 6/1974 | Aitken |
| 4,007,906 A | 2/1977 | Karpenko |
| 4,014,366 A * | 3/1977 | Critendon ................. G01F 1/42 138/44 |

(Continued)

FOREIGN PATENT DOCUMENTS

| | | |
|---|---|---|
| CA | 1174658 A | 9/1984 |
| CA | 2810121 C | 9/2012 |

(Continued)

OTHER PUBLICATIONS

Double Block and Bleed Flanged Products with Fugitive Emission options, Brochure from Parker, Jul. 2007, 1 page.

(Continued)

*Primary Examiner* — Reinaldo Sanchez-Medina
(74) *Attorney, Agent, or Firm* — Davis & Bujold PLLC; Michael J. Bujold

(57) ABSTRACT

There is provided a double closure orifice fitting having an orifice fitting body and a valve carrier sized to be installed within a valve cavity. The body of the valve carrier has an actuator surface on the bottom, retainer clip recesses formed in the first and second end, one or more spring members extending from the top, and a valve strip having retainer clips that is removably attached above the top of the valve carrier body and against the spring members by engaging the retainer clip recesses and the retainer clips such that the retainer clips are held in tension by the one or more spring members. The valve carrier is movable between an open position spaced laterally from the passageway and a sealed position such that the valve strip sealingly engages the valve cavity to seal the passageway by an actuator that engages the actuator surface.

6 Claims, 6 Drawing Sheets

(56) References Cited

U.S. PATENT DOCUMENTS

| | | | |
|---|---|---|---|
| 4,193,574 A | 3/1980 | Barnes et al. | |
| 4,275,763 A | 6/1981 | Fahrig | |
| 4,425,806 A | 1/1984 | Van Scoy | |
| 4,476,730 A | 10/1984 | Brumm | |
| 4,785,844 A | 11/1988 | Pankov | |
| 5,042,531 A * | 8/1991 | Foster | G01F 15/00 138/40 |
| 5,050,842 A * | 9/1991 | Foster | F16K 3/0227 251/176 |
| 5,094,270 A | 3/1992 | Reimert | |
| 5,186,474 A | 2/1993 | Jacobs | |
| 5,419,372 A * | 5/1995 | Wass | G01F 1/42 138/40 |
| 5,464,036 A | 11/1995 | Tomkins et al. | |
| 5,474,103 A | 12/1995 | Klak | |
| 5,483,992 A * | 1/1996 | Lehmann | F04B 39/1033 137/516.21 |
| 5,778,933 A | 7/1998 | Crane | |
| 5,836,356 A | 11/1998 | Desai | |
| 5,967,166 A * | 10/1999 | Carter | E21B 34/04 137/1 |
| 6,170,521 B1 | 1/2001 | Rohr et al. | |
| 6,354,568 B1 | 3/2002 | Carruthers | |
| 6,871,666 B1 | 3/2005 | Loga et al. | |
| 7,063,107 B2 | 6/2006 | Loga | |
| 7,104,521 B2 | 9/2006 | Loga | |
| 2004/0016463 A1 | 1/2004 | Shillito et al. | |
| 2005/0258389 A1 | 11/2005 | Loga | |
| 2007/0186987 A1 | 8/2007 | Loga et al. | |
| 2009/0194182 A1 | 8/2009 | Loga | |
| 2010/0229988 A1 | 9/2010 | Loga et al. | |

FOREIGN PATENT DOCUMENTS

| | | |
|---|---|---|
| CN | 2380765 Y | 5/2000 |
| CN | 201083275 Y | 7/2008 |
| DE | 3227897 A1 | 1/1984 |
| EP | X192910 A1 | 11/1983 |
| EP | 2657660 A1 | 10/2013 |
| ES | 282051 Y | 4/1985 |
| FR | 2470326 A1 | 5/1981 |
| WO | 2012120158 A1 | 9/2012 |

OTHER PUBLICATIONS

Double Block & Bleed Valves—Dual-Safe Series, Habonim bulletin, believed to be available prior to Jun. 25, 2014. 1 page.

PBM Double Block & Bleed Valves, product brochure from PBM, believed to be available prior to Jun. 25, 2014. 1 page.

Oliver Double Block & Bleed Valve Solutions, product catalog from Oliver Valves, believed to be available prior to Jun. 25, 2014, 1 page.

Three-Valve Double Block & Bleed Monoflange Specification Chart, believed to be available prior to Jun. 25, 2014, 1 page.

* cited by examiner

VALVE STRIP RETAINER ASSEMBLY

TECHNICAL FIELD

This relates to a valve strip retainer assembly used as part of sliding type isolation valves.

BACKGROUND

Dual chamber orifice fittings are often sealed by an isolation valve. The isolation valve allows an orifice plate to be replaced or inspected without the need to depressurize or interrupt the flow through the associated flow lines. One example of an orifice fitting with an isolation valve can be found in U.S. Pat. No. 5,474,103 (Klak) entitled "Safety Guard for Orifice Fitting Device".

SUMMARY

According to an aspect, there is provided a double closure orifice fitting, the orifice fitting comprising an orifice fitting body having an orifice plate seat at a first end of the orifice fitting body, a chamber at a second end of the orifice fitting body, a passageway that extends between the first end and the second end, the passageway being sized to permit an orifice plate to move along the passageway between the first end and the second end, and a valve cavity open to the passageway, the valve cavity comprising a valve seat around the passageway, and comprising a valve carrier sized to be installed within the valve cavity and movable between an open position and a sealed position, the valve carrier having a valve carrier body, an actuator surface on a bottom of the valve carrier body, retainer clip recesses formed in a first end and a second end of the valve carrier body, one or more spring members extending from a top of the valve carrier body, and a valve strip having retainer clips, the valve strip being removably attached above the top of the valve carrier body and against the one or more spring members by engaging the retainer clip recesses and the retainer clips such that the retainer clips are held in tension by the one or more spring members. The orifice fitting body further comprising an actuator that engages the actuator surface of the valve carrier when the valve carrier is installed in the valve cavity, the actuator selectively moving the valve carrier between the open position and the sealed position, wherein, in the open position the valve carrier is spaced laterally from the passageway and in the closed position, the valve carrier is within the passageway such that the valve strip sealingly engages the valve seat to seal the passageway.

According to another aspect, the actuator and valve cavity may be sized to compress the valve strip against the spring members to release tension between the retainer clips and the retainer clip recesses when the valve carrier is installed within the valve cavity.

According to another aspect, the top of the valve carrier body may comprise one or more spring recesses for receiving the one or more spring members.

According to another aspect, the retainer clip recesses may comprise grooves formed in end surfaces of the valve carrier body and the retainer clips may comprise loops pivotally attached to first and second ends of the valve strip, the retainer clips being sized to be received within the grooves.

According to another aspect the grooves may be oversized to permit downward movement of the retainer clips when a compressing force is applied to the spring members via the valve strip.

According to another aspect, the top of the valve carrier body may comprise positioning flanges for receiving the valve strip, the valve strip extending above the positioning flanges when attached to the valve carrier body.

According to another aspect, the valve strip may comprise a seal surface that sealingly engages the valve seat.

According to an aspect, there is provided a method of installing a valve carrier into a double closure orifice fitting, the double closure orifice fitting having a passageway sized to permit movement of an orifice plate, a valve cavity open to the passageway and comprising a valve seat, and an actuator that moves the valve carrier within the valve cavity between a sealing position and an open position, the method comprising the steps of assembling the valve carrier by providing a valve carrier body comprising one or more spring members extending from a top of the valve carrier body, an actuator surface on a bottom of the valve carrier body, and retainer clip recesses formed at each of a first end and a second end of the valve carrier body and attaching a valve strip above the top of the valve carrier body by compressing the valve strip against the one or more spring members and engaging retainer clips between the valve strip and the retainer clip recesses, the retainer clips being held in tension by the one or more spring members and inserting the valve carrier into the valve cavity such that the actuator surface engages the actuator and the valve strip sealingly engages the valve seat.

According to another aspect, the actuator may be positioned within the valve cavity such that, when the valve carrier is engaged by the actuator within the valve cavity, the valve strip is further compressed against the spring members and releases tension between the retainer clips and the retainer clip recesses.

According to another aspect, the top of the valve carrier body may comprise one or more spring recesses for receiving the one or more spring members.

According to another aspect, the retainer clip recesses may comprise grooves formed in end surfaces of the valve carrier body and the retainer clips may comprise loops pivotally attached to first and second ends of the valve strip, the retainer clips being sized to be received within the grooves.

According to another aspect, the grooves may be oversized to permit downward movement of the retainer clips when a compressing force is applied to the spring members via the valve strip.

According to another aspect, the top of the valve carrier body may comprise positioning flanges for receiving the valve strip, the valve strip extending above the positioning flanges when attached to the valve carrier body.

According to another aspect, the valve strip may comprise a seal surface that sealingly engages the valve seat.

According to an aspect, there is provided a valve carrier comprising a valve carrier body, an actuator surface on a bottom of the valve carrier body, retainer clip recesses formed in a first end and a second end of the valve carrier body, one or more spring members extending from a top of the valve carrier body, a valve strip having retainer clips, the valve strip being removably attached above the top of the valve carrier body and against the one or more spring members by engaging the retainer clip recesses and the retainer clips such that the retainer clips are held in tension by the one or more spring members, and a separation gap defined by the valve strip and the top of the valve carrier body, the separation gap being maintained by the one or more spring members and the retainer clips, wherein the one or more spring members are compressible to reduce the separation gap and release tension in the retainer clips.

According to another aspect, the top of the valve carrier body may comprise one or more spring recesses for receiving the one or more spring members.

According to another aspect, the retainer clip recesses may comprise grooves formed in end surfaces of the valve carrier body and the retainer clips may comprise loops pivotally attached to first and second ends of the valve strip, the retainer clips being sized to be received within the grooves.

According to another aspect, the grooves may be oversized to permit downward movement of the retainer dips when a compressing force is applied to the spring members via the valve strip.

According to another aspect, the top of the valve carrier body may comprise positioning flanges for receiving the valve strip, the valve strip extending above the positioning flanges when attached to the valve carrier body.

According to another aspect, the valve strip may comprise a seal surface that sealingly engages the valve seat.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
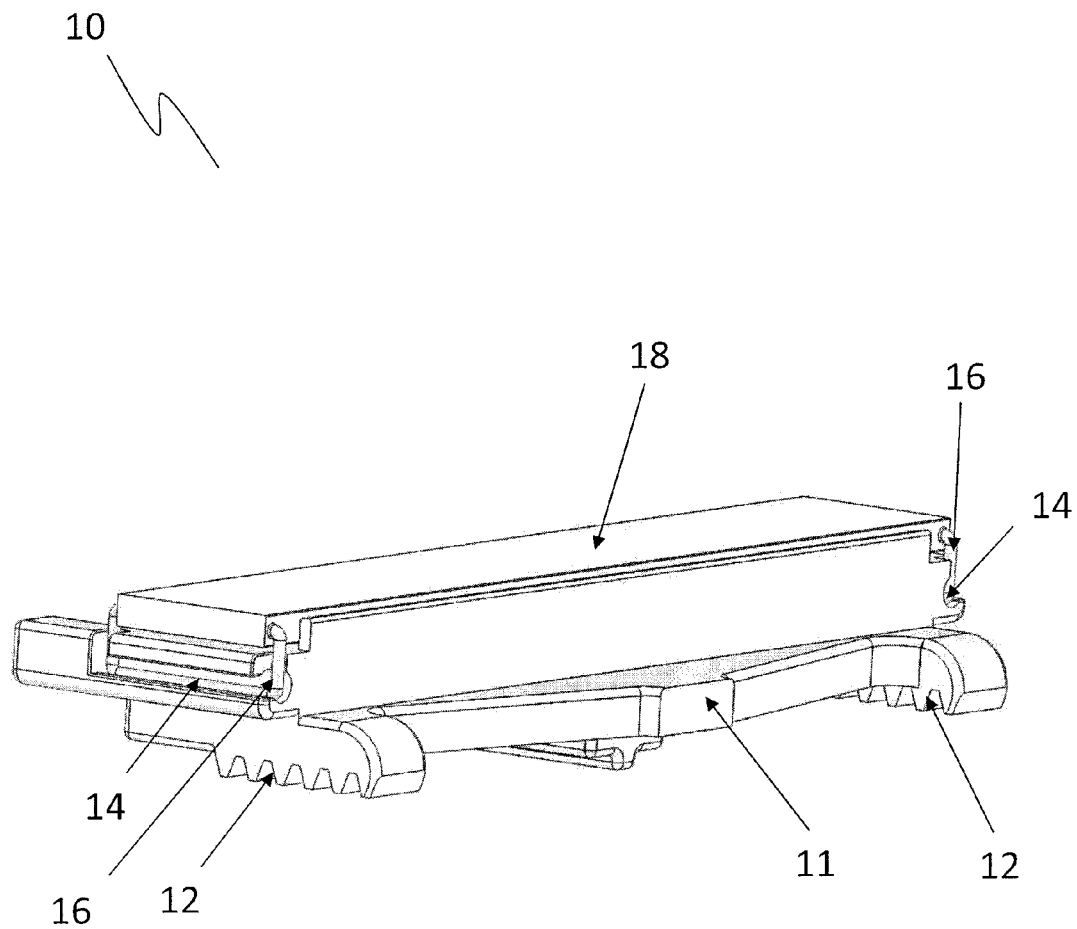
FIG. 1 is a front perspective view of a valve carrier.

A valve carrier generally identified by reference numeral 10 and a double closure orifice fitting generally identified by reference numeral 100, will now be described with reference to FIG. 1 through 9.

Referring to FIG. 1, valve carrier 10 has a valve carrier body 11 with an actuator surface 12 on the bottom and a valve strip 18 on the top of the body. As used herein, the terms "top" and "bottom" refer to the orientation relative to the end of orifice fitting 100 that attaches to the pressurized body, such as a pipeline. As such, pressure is considered to be applied to the bottom of the valve carrier body toward the top, even though the actual orientation of orifice fitting 10 may vary depending on how it is installed.

Figure 2:
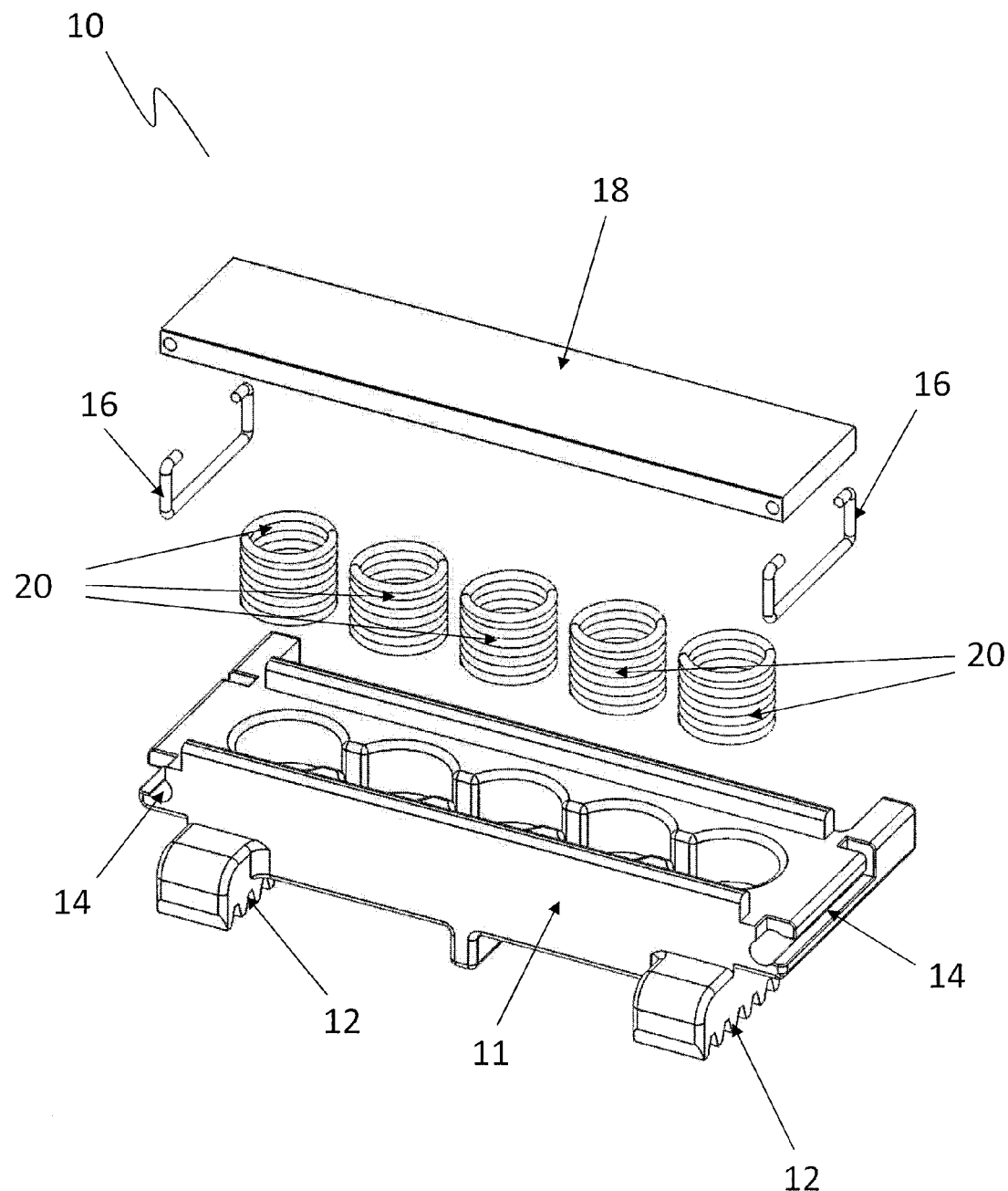
FIG. 2 is an exploded front perspective view of a valve carrier.
Figure 3:
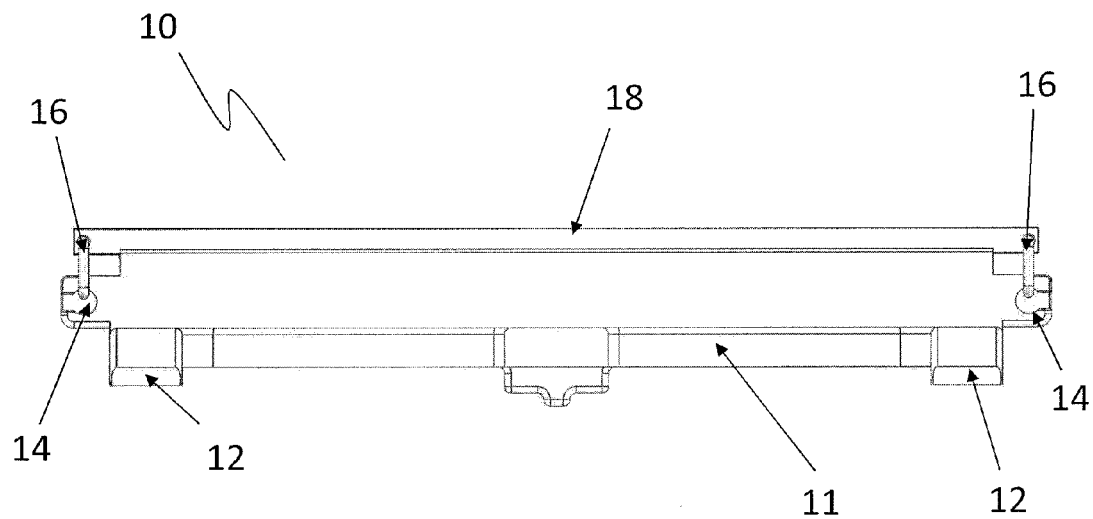
FIG. 3 is a front elevation view of a valve carrier.
Figure 4:
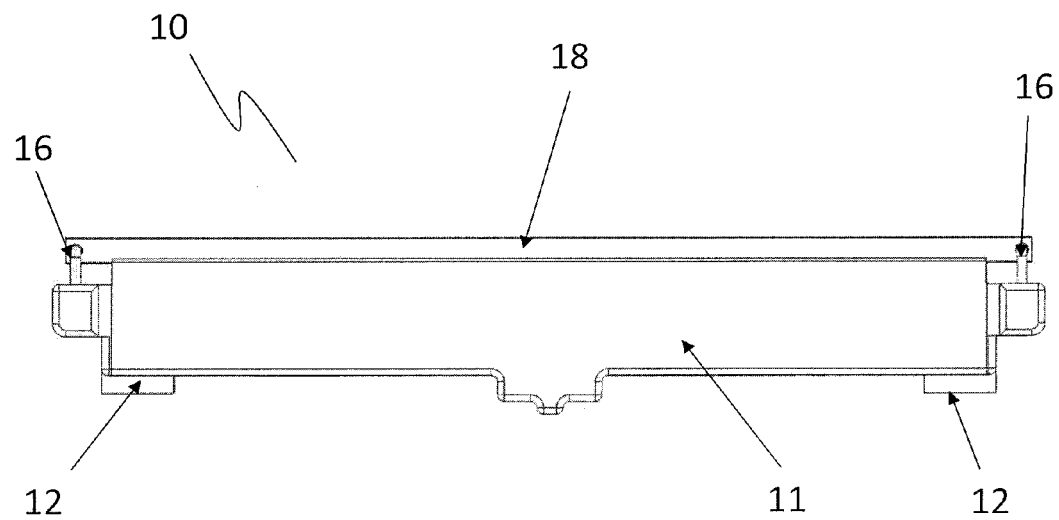
FIG. 4 is a rear elevation view of a valve carrier.
Figure 5:
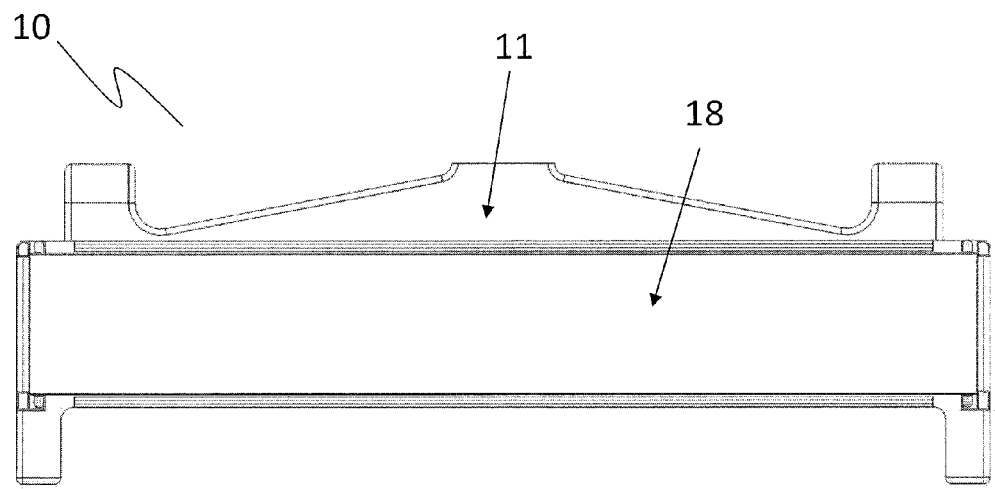
FIG. 5 is a top plan view of a valve carrier.
Figure 6:
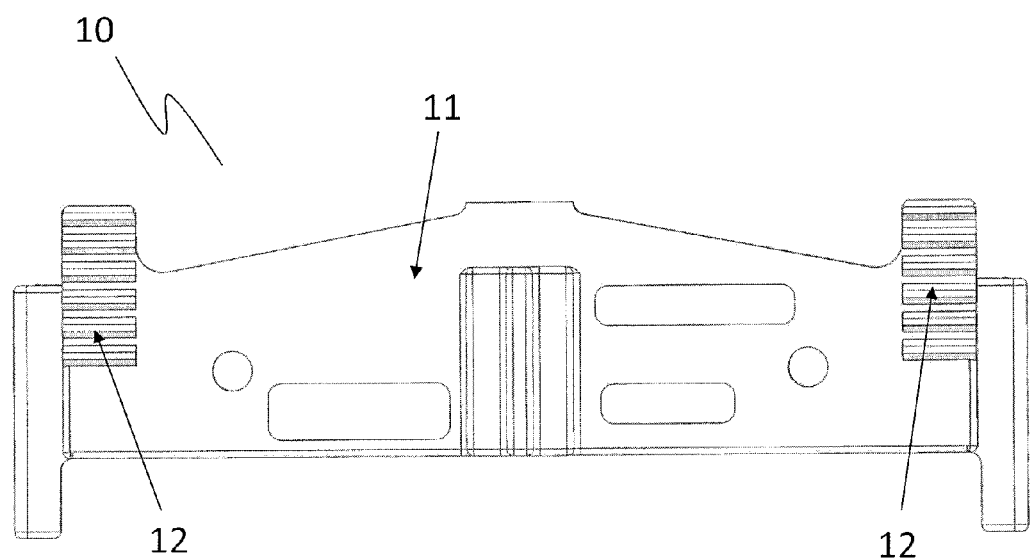
FIG. 6 is a bottom plan view of a valve carrier.
Figure 7:
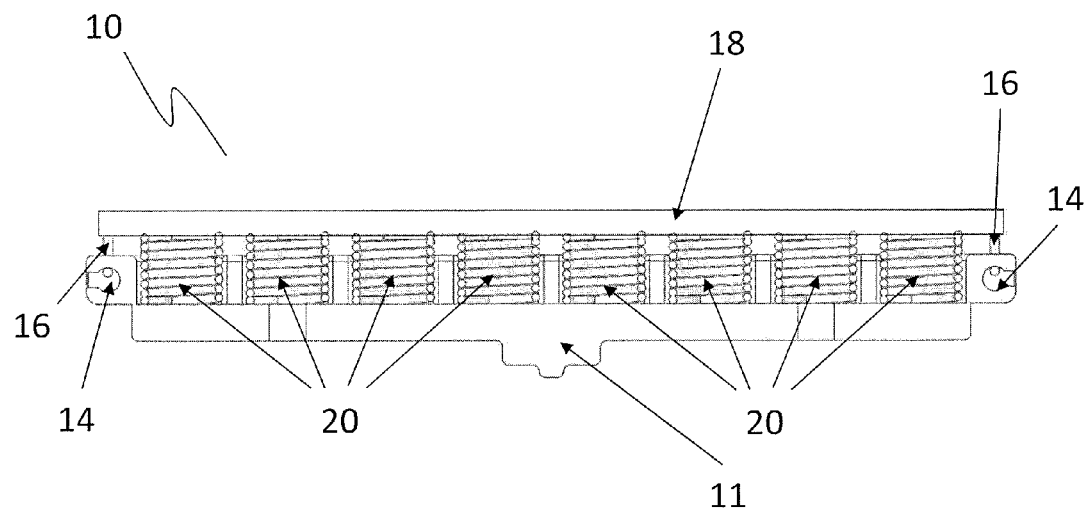
FIG. 7 is a front elevation view in section of a valve carrier.
Figure 8:
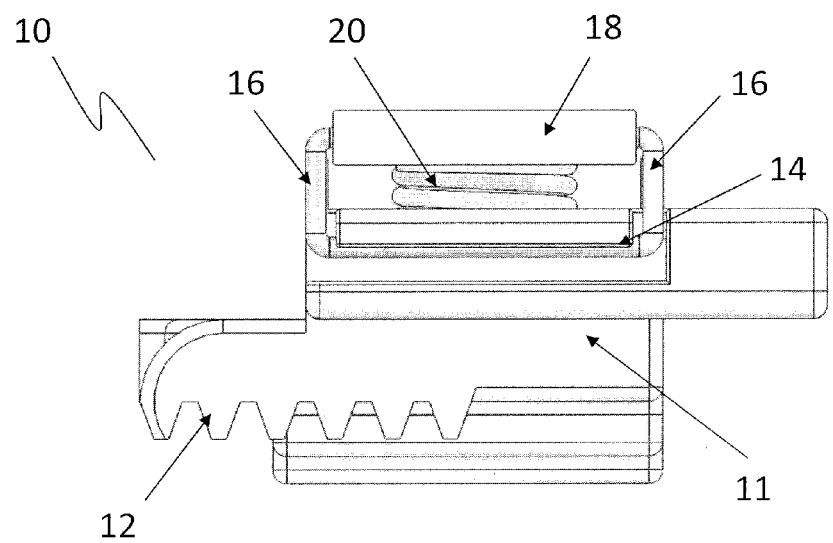
FIG. 8 is a side elevation view in section of a valve carrier.

As shown, actuator surface 12 comprises gear teeth on the underside or bottom of valve carrier body 11. As will be understood by those skilled in the art, various types of actuator surfaces 12 could be used to achieve movement of valve carrier body 11 aside from the depicted example. Valve carrier 10 has retainer clip recesses 14 formed in the first end and second end of valve carrier body 11. Retainer clip recesses 14 can take various shapes depending on the shapes of retainer clips 16, and may be any type of recess known in the art that can engage or be engaged by retainer clips 16. Retainer clips 16 are attached to valve strip 18 at the first and second ends of valve strip 18. Referring to FIG. 2, valve strip 18 overlies spring members 20, which extend from the top of valve carrier body 11. As shown, spring members 20 comprise multiple coil compression springs, although the number, shape and type of spring member may vary depending on the preferences of the user. Referring to FIG. 7, when the valve strip 18 is placed onto spring members 20 and retainer clips 16 engage retainer clip recesses 14, the spring members 20 are compressed by the valve strip 18 and the retainer clips 16 are held in tension between retainer clip recesses 14 and valve strip 18.

Figure 9:
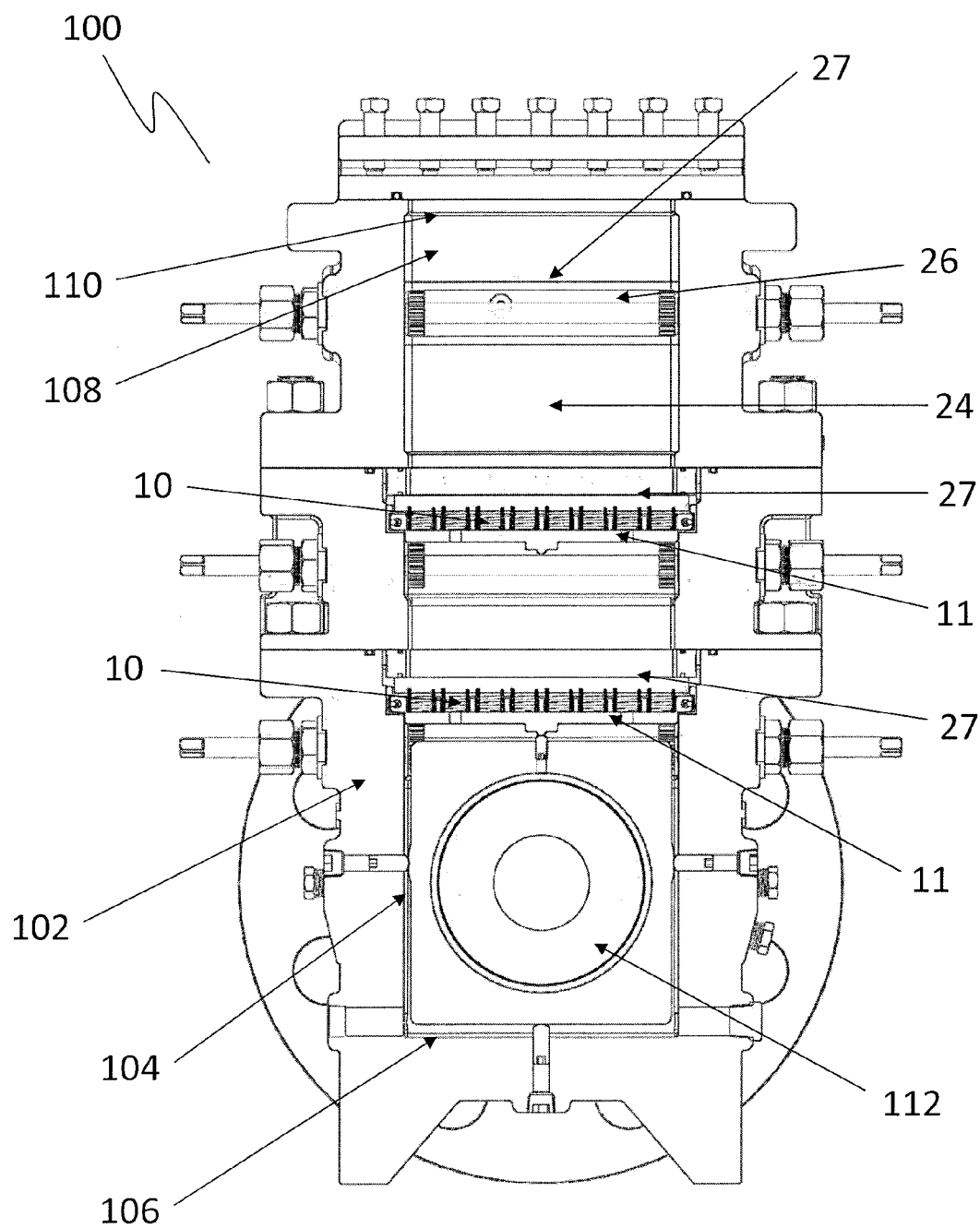
FIG. 9 is a front elevation view in section of a valve assembly.

Referring to FIG. 9, orifice fitting 100 has an orifice fitting body 102 with a plate seat 104 at a first end 106 and a chamber 108 at a second end 110 of orifice fitting body 102. Orifice fitting body 102 also has a passageway 24 that extends between plate seat 104 and chamber 106 and that is sized to permit an orifice plate to move along passageway 24 between first and second ends 106 and 110. In operation an orifice plate 112 is positioned in plate seat 104 and is moved along passageway 24 to be removed from chamber 108 for servicing. Passageway 24 has a valve cavity 26 that is open to it. Valve cavity 26 is sized to receive a valve carrier 10 and has a valve seat 27 that extends around passageway 24. As can be seen, valve seat 27 is oriented perpendicular to the direction of passageway 24 to provide a proper seal when engaged by valve strip 18, which is designed to be larger than the cross-section of passageway 24. It will be understood that valve seat 27 and valve strip 18 may have other designs that also permit passageway to be sealed when valve carrier 10 is in the closed position. When valve carrier 10 is placed into valve cavity 26, pressure is applied against valve strip 18, resulting in valve strip 18 further compressing spring members 20, which results in retainer clips 16 no longer being under tension against retainer clip recesses 14. Retainer clips 16 may then be pushed out of engagement with retainer clip recesses 14.

In order to install valve carrier 10 into orifice fitting 100, valve carrier 10 is first assembled. Valve strip 18 is placed on springs 20 such that it is supported above valve carrier body 11 by springs 20. A force is applied to valve strip 18 to compress springs 20 and allow retainer clips 16 to be inserted into retainer clip recesses 14. Once the compression force against valve strip 18 is released retainer clips 16 are placed in tension by springs 20 as they are held between retainer clip recesses 14 and valve strip 18. Valve carrier 10 is then placed into valve cavity 26 by various known methods. Once valve carrier 10 is fully into cavity 26, the inner surface of cavity 26 will apply pressure against valve strip 18 and further compress spring member 20. This releases the tension in retainer clips 16. When removing valve carrier 10 from orifice fitting 100, retainer clips 16 may re-engage retainer clip recesses 14, depending on the condition of valve carrier 10.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A valve carrier for an orifice fitting comprising: a valve carrier body; an actuator surface on a bottom of the valve carrier body; retainer clip recesses formed in a first end and a second end of the valve carrier body; one or more spring members extending from a top of the valve carrier body; a valve strip having retainer clips, the valve strip being removably attached above the top of the valve carrier body and against the one or more spring members by engaging the retainer clip recesses and the retainer clips such that the retainer clips are held in tension by the one or more spring members, and the retaining clips facilitate forming a retaining connection with the valve carrier body and facilitate removal of the valve carrier from the orifice fitting; and a separation gap defined by the valve strip and the top of the valve carrier body, the separation gap being maintained by the one or more spring members and the retainer clips, wherein the one or more spring members are compressible to reduce the separation gap and release tension in the retainer clips.

2. The valve carrier of claim 1, wherein the top of the valve carrier body comprises one or more spring recesses for receiving the one or more spring members.

3. The valve carrier of claim 1, wherein the retainer clip recesses comprise grooves formed in end surfaces of the valve carrier body and the retainer clips comprise loops pivotally attached to first and second ends of the valve strip, the retainer clips being sized to be received within the grooves.

4. The valve carrier of claim 3, wherein the grooves are oversized to permit downward movement of the retainer clips when a compressing force is applied to the spring members via the valve strip.

5. The valve carrier of claim 1, wherein the top of the valve carrier body comprises positioning flanges for receiving the valve strip, the valve strip extending above the positioning flanges when attached to the valve carrier body.

6. The valve carrier of claim 1, wherein the valve strip comprises a seal surface that is adapted to sealingly engage a valve seat in a valve cavity.

\* \* \* \* \*